United States Patent [19]

Yada et al.

[11] Patent Number: 5,344,205
[45] Date of Patent: Sep. 6, 1994

[54] AUTOMOBILE WINDSHIELD MOLDING

[75] Inventors: Yukihiko Yada; Tosikazu Ito, both of Aichi, Japan

[73] Assignee: Tokai Kogyo Kabushiki Kaisha, Ohbu, Japan

[21] Appl. No.: 788,353

[22] Filed: Nov. 6, 1991

[30] Foreign Application Priority Data

Nov. 7, 1990 [JP] Japan .................................. 117095

[51] Int. Cl.$^5$ ............................................. B60J 10/02
[52] U.S. Cl. ....................................... 296/93; 296/208; 52/716.5; 52/400
[58] Field of Search ............................ 296/93, 201, 208; 52/397, 400, 402, 403, 716.5, 718.1

[56] References Cited

U.S. PATENT DOCUMENTS

| | | | |
|---|---|---|---|
| 4,757,659 | 7/1988 | Miyakawa et al. | 52/400 |
| 4,757,660 | 7/1988 | Miyakawa et al. | 52/400 |
| 4,840,001 | 6/1989 | Kimisawa | 52/208 |
| 4,950,019 | 8/1990 | Gross | 296/93 |
| 4,984,839 | 1/1991 | Miyakawa et al. | 296/93 |
| 5,035,459 | 7/1991 | Yada | 296/93 |
| 5,039,157 | 8/1991 | Yada | 296/93 |
| 5,094,498 | 3/1992 | Yada | 296/93 |
| 5,114,206 | 5/1992 | Yada | 296/201 |

FOREIGN PATENT DOCUMENTS

| | | | |
|---|---|---|---|
| 247513 | 11/1986 | Japan | 296/93 |
| 53220 | 3/1987 | Japan | 296/201 |

*Primary Examiner*—Dennis Pedder
*Attorney, Agent, or Firm*—Oblon, Spivak, McClelland, Maier & Neustadt

[57] ABSTRACT

An automobile windshield molding comprising a molding body having molding parts and a fastener is installed in a space between a windshield and a window opening of automobile body panels. The fastener having a bendable protector which is bent by the molding for defining a space between the side molding part and an upper surface of the windshield. This space serves as a water drain channel. The size of the water drain channel is changed according to a varying difference of height between the body panels and the windshield.

3 Claims, 5 Drawing Sheets

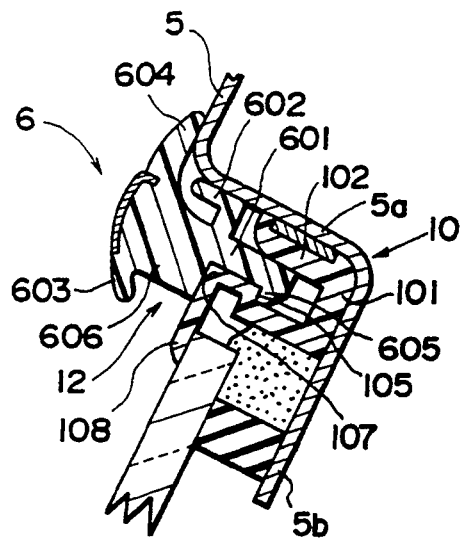
FIG. 4
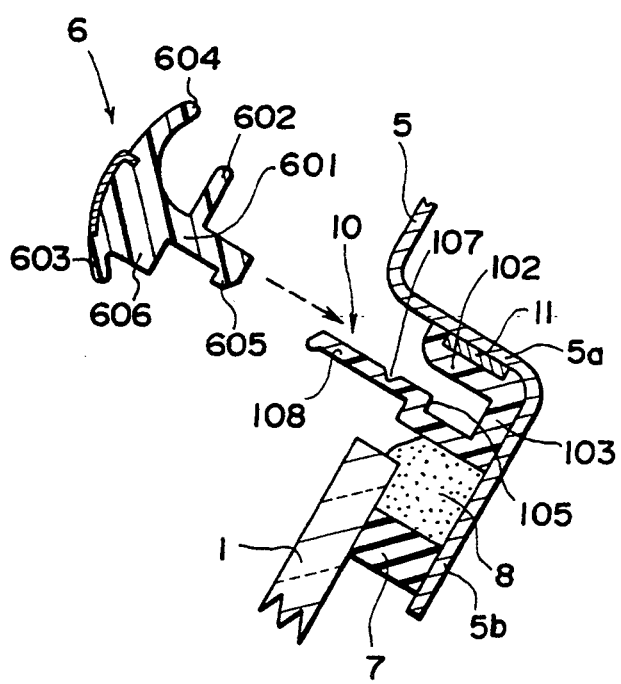
FIG. 5
FIG. 6
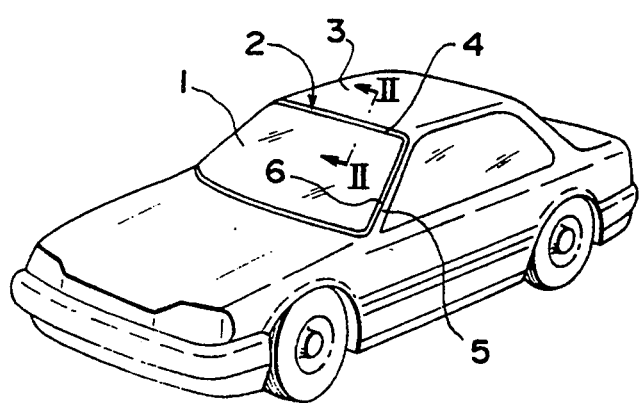

AUTOMOBILE WINDSHIELD MOLDING

BACKGROUND OF THE INVENTION

1. Field of the Invention

This invention relates to an automobile windshield molding for a motor vehicle body to seal the space between a windshield and a periphery of a window opening of a vehicle body panel.

2. Description of the Related Art

An automobile windshield molding is usually attached around an edge of a windshield to seal the space between the windshield and a window opening of a vehicle body panel. The windshield molding (called "molding" hereinafter) is a strip-like member manufactured by an extrusion process. The molding is directly attached to the vehicle body panel or is supported by a fastener mounted on the body panel.

Examples of such molding are exemplified in Japanese Patent Laid-Open Publications 1-244820 (1989) and 1-269612 (1989).

In the former, an extruded molding has two grooves on its side surfaces. One of members defining the grooves are removed at a portion associated with the upper edge of the windshield. At the corner portions, the molding is elastically reshaped so that the groove for receiving the upper edge of the windshield is merged with the groove for the side edge of the windshield. The remaining groove of the molding at each pillar panel serves as a water drain channel.

Since it has a uniform shape, the molding cannot be applied to a vehicle body panel having a varying shape. In addition, the ends of the removed member may be exposed at the corner portions.

To overcome these drawbacks, Japanese Patent Laid-Open Publication 1-269612 (1989) was proposed, in which an extruded molding is of a simple shape, having a large leg portion. The large leg portion is cut at the upper and side molding parts so that the leg portion extends to different heights at these molding parts. A windshield receiving groove is formed by cutting the leg portion partially. Then the molding is elastically reshaped so that the windshield receiving groove at the upper molding part and the groove at the side molding part can be aligned. At the side molding part, the leg portion serves as a wall, outside of which a water drain channel is defined.

In the latter case, there are some drawbacks. For example, part of the molding should extend over the upper surface of the windshield to a certain extent when considering variations in manufacturing precision or assembling work. In such a case, the more the molding extends over the windshield surface, the less the sectional area of the water drain channel.

SUMMARY OF THE INVENTION

It is therefore an object of this invention to provide a molding which includes a water drain channel defined between side edges of a windshield and body panels.

According to a first aspect of this invention there is provided an automobile windshield molding for sealing the space between a windshield and a periphery of a window opening of an automobile body panel. The molding comprises a molding body and a fastener. The molding body includes a pair of extruded side molding parts, an extruded upper molding part integral with and extending between the side molding parts and an extruded fastener. The side molding part is attached to the automobile body panels via the fastener, and the fastener has a protector to be bent by the molding and to define a space serving as a water drain channel between the side molding part and an upper surface of the windshield. The protector has a notch.

With this invention, the fastener is firstly installed to the body panel of the vehicle while the protector of the fastener is upright. Therefore, the windshield can be attached to the automobile body panel without any interference with the protector. When the molding is installed, the protector is partially bent, defining a space between itself and the molding. This space serves as a water drain channel. Therefore, the molding can be installed with the fastener, thereby offering a space sufficient for the water drain channel.

BRIEF DESCRIPTION OF THE DRAWINGS

FIGS. 3 and 4 are cross-sectional views of the fastener, respectively taken along lines III—III and IV—IV of FIG. 2;

FIG. 5 is a cross-sectional view showing how the molding is attached to the fastener;

FIG. 6 is a front perspective view of a motor vehicle having the windshield molding;

DETAILED DESCRIPTION

Figure 1:
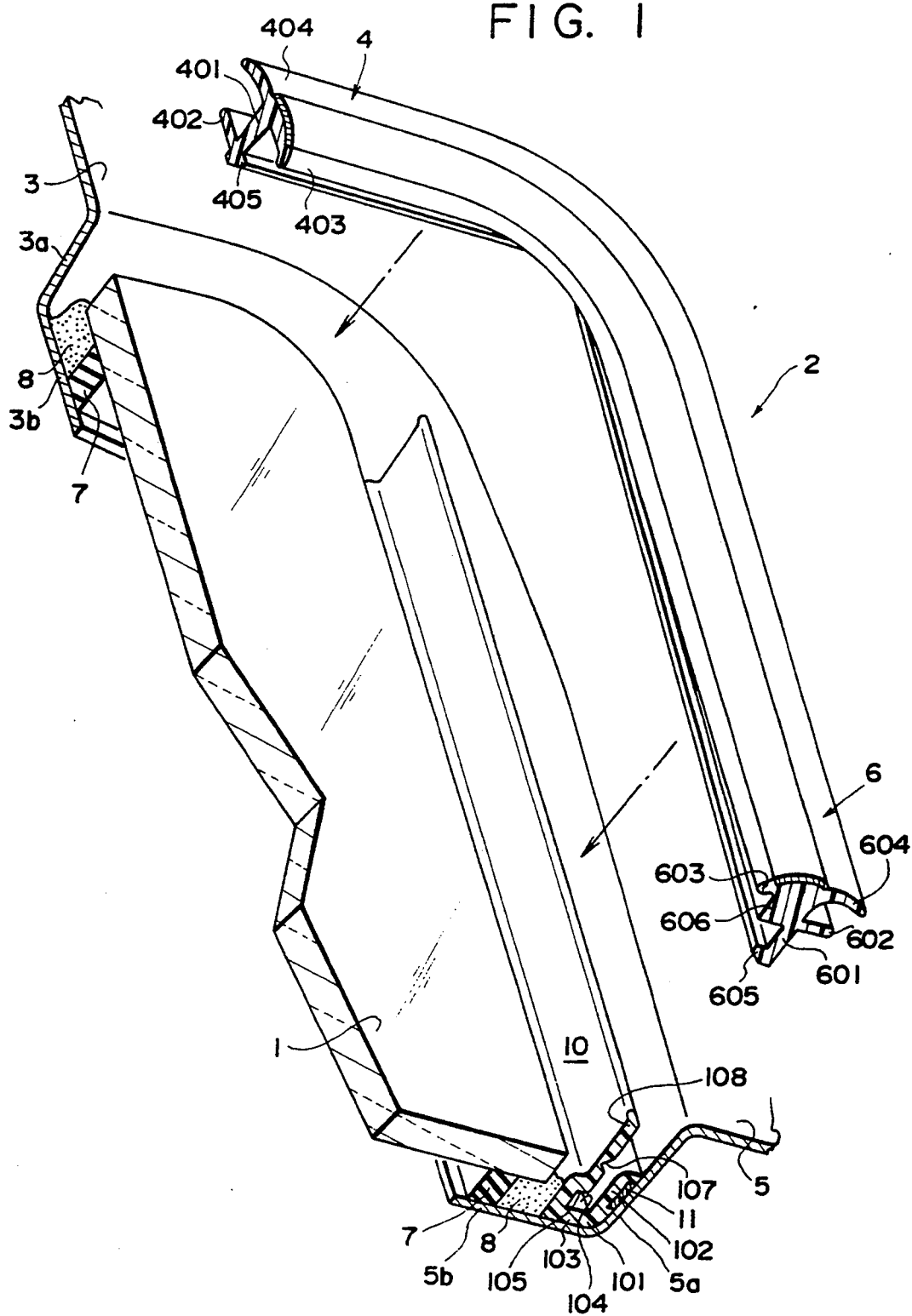
FIG. 1 is an exploded perspective view of a molding and a fastener near a corner of a window opening, according to a first embodiment of this invention.

A first embodiment of this invention is shown in FIGS. 1 to 5.

As shown in FIG. 6, a molding is installed to seal the space between a windshield and a periphery of a window opening of vehicle body panels.

The molding is in the shape of a strip, comprising a molding body 2 and a fastener 10. The molding body 2 includes a pair of extruded side molding parts 6, an extruded upper molding part 4 integral with and extending between the side molding parts 6, and a fastener 10 as a separate member. The upper molding part 4 is installed between the upper edge of a windshield 1 and a roof panel 3, and each side molding part 6 and fastener 10 are installed between each side edge of the windshield 1 and each pillar panel 5. All of these molding parts 4, 6 are extruded in the strip shape. The fastener 10 is also extruded in the shape of a strip.

The upper molding part 4 is directly attached to the roof panel 3, while the side molding parts 6 are attached to the pillar panels 5 via the fasteners 10, (not shown in FIG. 6).

Figure 2:
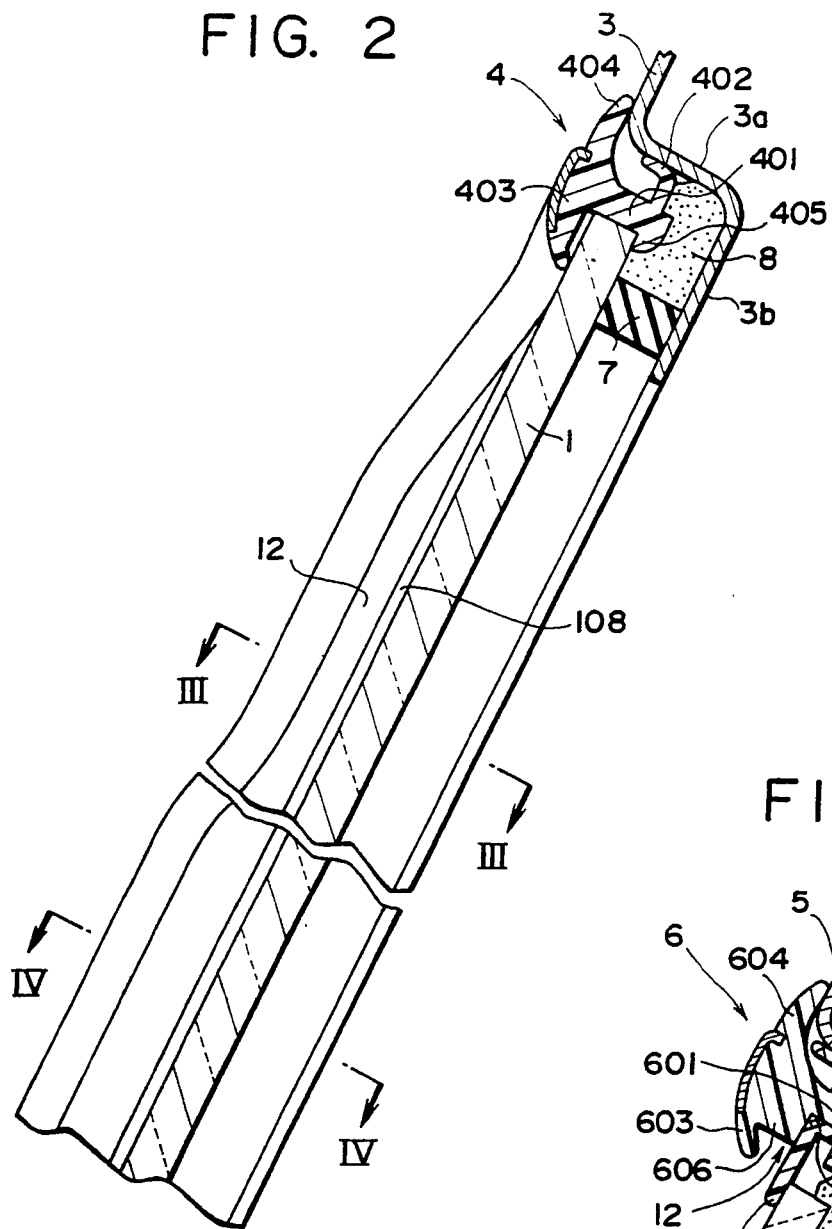
FIG. 2 is a cross-sectional view of the molding of FIG. 1, taken along line II—II of FIG. 6.

As shown in FIGS. 1 and 2, the roof panel 3 is folded to form an intermediate wall 3a and a flange 3b (at the lower right side of FIG. 2). The windshield 1 is placed to overlap on the flange 3b via a dam rubber 7, so that the upper edge of the windshield 1 confronts the intermediate wall 3a with a space between them. An adhesive 8 is filled in a space defined by the windshield 1, intermediate wall 3a and flange 3b to fasten these members firmly.

The upper molding part 4 is installed in the space defined by the windshield 1 and the intermediate wall 3a of the roof panel 3.

The upper molding part 4 includes an outward wing 404, an inward wing 403, and a leg portion 401 extending downwardly from the outward and inward wings 404, 403. The leg portion 401 is contacted with the upper edge of the windshield 1. The outward and inward wings 404, 403 are in the shape of lip to seal a space between the roof panel 3 and the molding 4, and to seal the upper peripheral edge of the windshield 1, respectively.

The leg portion 401 has a connecting portion 402 extending therefrom, and a foot 405 extending along the end thereof. The connecting portion 402 is in pressure contact with the intermediate wall 3a of the roof panel 3. The foot 405 is in contact with the upper edge of the windshield 1. Thus, the upper molding part 4 is reliably supported in the space between the roof panel 3 and the windshield 1.

Figure 3:
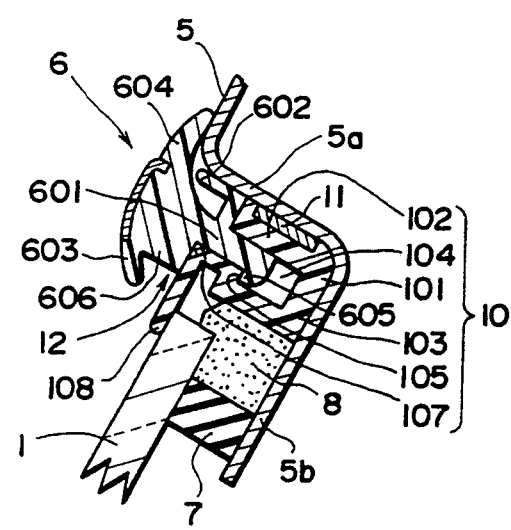

As shown in FIGS. 1 and 3, the structure of the pillar panel 5 is essentially the same the roof panel 3. The fastener 10 is mounted on the flange 5b of the pillar panel 5 near a second bend of the intermediate wall 5a. The windshield 1 is positioned to overlap on the flange 5b via the dam rubber 7 so that the side edge of the windshield 1 confronts the fastener 10 with a space defined between them. The windshield 1 and flange 5b are fastened by the adhesive 8. The fastener 10 is used as means for installing the side molding part 6.

As shown in FIG. 1, the fastener 10 includes a protector 108, an L-shaped member 103, a base 101 and a wall 102. The wall 102 extends upwardly to be in contact with the intermediate wall 5a of the pillar panel 5. The wall 102 and L-shaped member 103 define a space 104 for receiving the side molding part 6. The L-shaped member 103 has a step 105, with which the side molding part 6 is engaged as described below.

The fastener 10 is attached to the pillar panel 5 by a double adhesive tape 11. The protector 108 and the L-shaped member 103 is divided by a notch 107. The protector 108 is bent at the notch 107 to come into contact with the upper surface of the windshield 1 when the fastener 10 is engaged with the side molding part 6.

Contrary to the upper molding part 4, the side molding part 6 changes its shape gradually and in two steps. Specifically, as shown in FIGS. 3 and 4, the leg portion 601 gradually increases its height, and the underside of the inward wing 603 becomes wider and higher in two steps, so that a wall 606 is formed under the inward wing 603.

When the leg portion 601 is inserted in the space 104 of the fastener 10, the foot 605 is engaged with the step 105 of the fastener 10. Thus the side molding part 6 is firmly engaged with the fastener 10.

The bottom of the wall 606 is in contact with the protector 108 of the fastener 10. The protector 108 is upright because of its resiliency before the side molding part 6 is inserted in the fastener as shown in FIG. 5. However when the side molding part 6 is installed, the wall 606 of the side molding part 6 is contacted with the protector 108, so that the protector 108 is bent by approximately 90 degrees at the notch 107. Thereafter, the protector 108 comes into contact with the side edge of the windshield 1. The inward wing 603 of the side molding part 6 is not in contact with the upper surface of the windshield 1.

This condition is maintained after the side molding part 6 is fastened to the fastener 10.

As shown in FIG. 5, the protector 108 of the fastener 10 is upright when the fastener 10 is attached to the pillar panel 5. Then the windshield 1 is installed without any interference with the protector 108 which remains upright.

After this, the leg portion 601 of the side molding part 6 is inserted in the fastener 10, so that the protector 108 is bent as shown in FIGS. 3 and 4, being pressed to the side edge of the windshield 1. The protector 108 maintains its bent posture, defining the water drain channel 12 together with the side molding part 6.

The inward wing 603 extends over the side edge of the windshield 1, defining a substantially U-shaped space with the wall 606, the protector 108, and the windshield 1. The water drain channels 12 are formed along the side edges of the windshield 1, guiding fluid such as rain water to a specified direction, and preventing the fluid from being sprayed onto the side windows. The outward wing 604 is in flexible contact with the pillar panel 5, sealing the space between the pillar panel and the windshield 1.

The water drain channel 12 gradually increases its cross-sectional area since the side molding part 6 changes its size according to the varying height of the pillar panel 5.

A molding according to a second embodiment is shown in FIGS. 7 to 10. The same reference numerals as those of the first embodiment are used for the windshield, roof panel, and pillar panel. In this embodiment, upper and side molding parts 24, 26 are attached to the body panels 3, 5 via upper and side fasteners 20, 30.

Figures 7, 8:
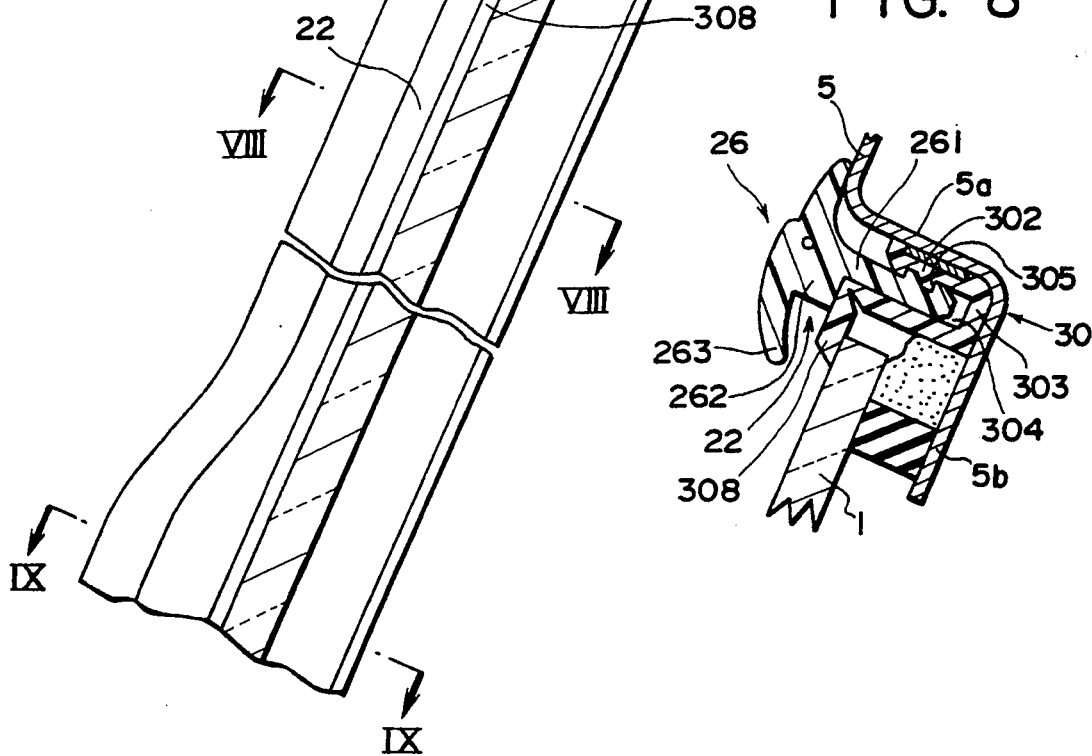
FIGS. 7 to 10 are views similar to FIGS. 2 to 5, showing cross sections of a molding and a fastener according to a second embodiment of this invention.

As shown in FIG. 7, the upper fastener part 20 is attached along the intermediate wall 3a and the flange 3b of the roof panel 3. The upper fastener part 20 is U-shaped, having a space 204 for receiving the upper molding part 24. The upper fastener part 20 has a step 205 on its one inner wall facing the space 204.

The leg portion 241 has a step 245 for engagement with the step 205 of the fastener 20, so that the upper molding part 24 is firmly received in the fastener 20.

Figure 9:
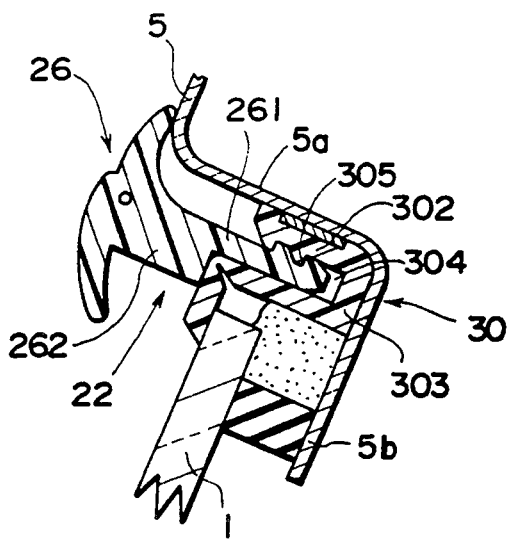
Figure 10:
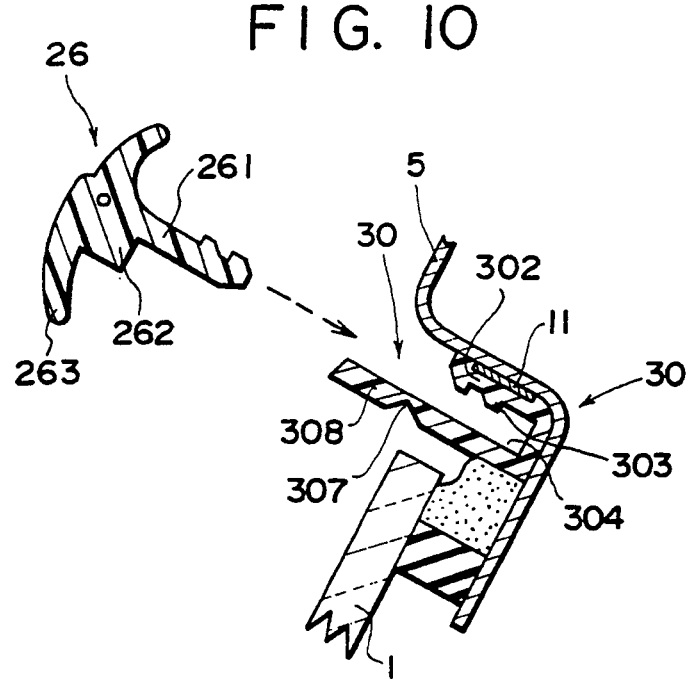

FIGS. 8 and 9 show how the side fastener part 30 is attached along the intermediate wall 5a and flange 5c of the pillar panel 5, and how the side molding part 26 is received in the side fastener part 30. As shown in FIG. 8, the side fastener part 30 has a protector 308 extending from one end thereof. The side fastener part 30 differs from the upper fastener part 20 in the existence of the protector 308.

The leg portion 261 of the side molding part 26 is received in the space 304 defined by the side fastener part 30 substantially similarly to the leg portion 241 shown in FIG. 7. The side molding part 26 is firmly fitted in the side fastener part 30 through the engagement of the step 305 of the side fastener part 30 and the step 265 of the side molding part 26.

The side molding part 261 gradually changes its shape as shown in FIGS. 8 and 9. Specifically, the leg portion 261 increases its height at its upper and central regions, and the underside of the inward wing 263 becomes wider and higher, forming a wall 262. The bottom of the wall 262 is in contact with the protector 308 which is bent 90 degrees at a notch 307 (shown in FIG. 10).

The inward wing 263 extending over the windshield 1 forms a space with the wall 262 and the protector 308. This U-shaped space is used as a water drain channel 22. The water drain channel 22 gradually increases its cross-sectional area since the side molding part 26 and the side fastener part 30 change their shape according to the varying difference of height between the pillar panel 5 and the side edge of the windshield.

The molding of the second embodiment is as effective as the molding of the first embodiment.

What is claimed is:

1. An automobile windshield molding for sealing a space between a windshield and a periphery of a window opening of an automobile body panel, said molding comprising:

a molding body and a fastener, said fastener including a bendable protector which is bent as said molding body is inserted into said fastener, said bendable protector being bent by the insertion of said molding body from an upright position in which said bendable protector has a longitudinal axis which is substantially perpendicular to an upper surface of said windshield for permitting an insertion of the windshield, to a bent position in which the bendable protector is bent by said molding body and pressed against said upper surface of said inserted windshield by said molding body so as to maintain a position of said windshield with respect to the automobile body panel.

2. An automobile windshield molding according to claim 1, wherein said bendable protector in said bent position in which the bendable protector is pressed against said upper surface of said windshield defines a water drain space between said molding body and said bendable protector.

3. An automobile windshield molding according to claim 1, wherein said bendable protector has a notch.

* * * * *

UNITED STATES PATENT AND TRADEMARK OFFICE
CERTIFICATE OF CORRECTION

PATENT NO. : 5,344,205
DATED : September 6, 1994
INVENTOR(S) : Yukihiko YADA, et al.

It is certified that error appears in the above-indentified patent and that said Letters Patent is hereby corrected as shown below:

On the title page, Item [30], the Foreign Application Priority Number is incomplete. It should read:

--2-117095--

Signed and Sealed this

Twenty-fourth Day of January, 1995

Attest:

BRUCE LEHMAN

*Attesting Officer*     *Commissioner of Patents and Trademarks*